W. SHAW.
SHOE.
APPLICATION FILED SEPT. 29, 1915.
1,269,652.
Patented June 18, 1918.
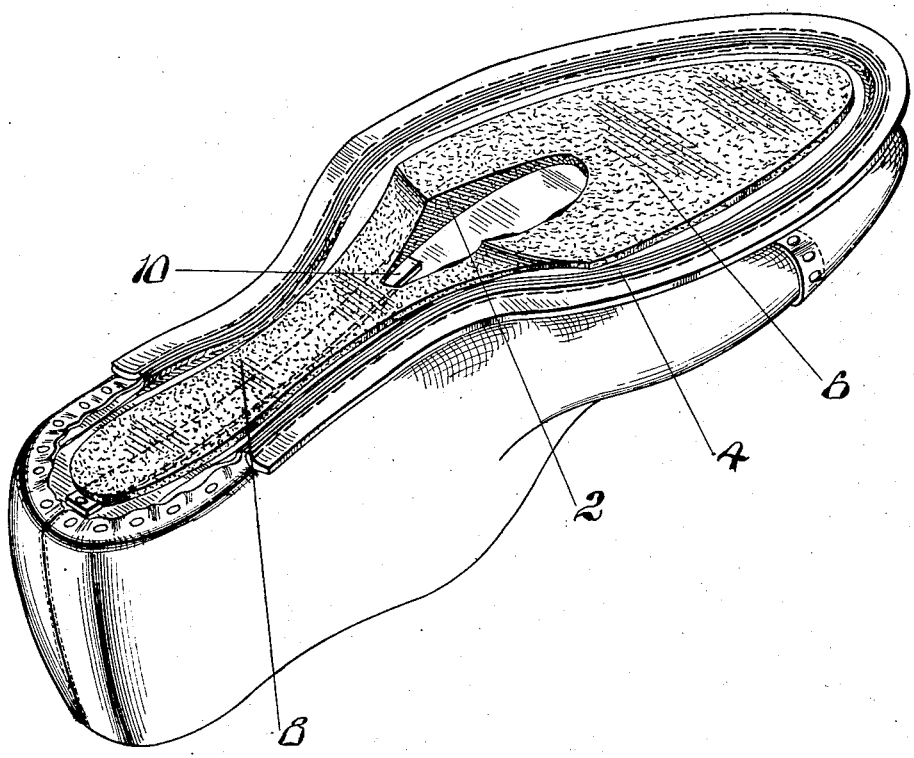
INVENTOR.
Walter Shaw

UNITED STATES PATENT OFFICE.

WALTER SHAW, OF DEDHAM, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SHOE.

1,269,652.      Specification of Letters Patent.     Patented June 18, 1918.

Application filed September 29, 1915. Serial No. 53,169.

*To all whom it may concern:*

Be it known that I, WALTER SHAW, a citizen of the United States, residing at Dedham, in the county of Norfolk and State of Massachusetts, have invented certain Improvements in Shoes, of which the following description, in connection with the accompanying drawings, is a specification, like reference characters on the drawings indicating like parts in the several figures.

This invention relates to boots and shoes and particularly to shoe fillers and shank pieces for boots and shoes.

In the manufacture of welt shoes it is essential to apply a filling material to the space within the inseam on the shoe bottom so as to provide a substantially level bottom to receive the outsole and also to incorporate a shank piece in the shoe to provide support for the arched shank portion of the foot. The filler ordinarily used consists of a plastic composition of ground cork and rubber or like materials which are spread over the shoe bottom in a heated condition and allowed to "set." The application of the filler to the shoe bottom is customarily performed by hand immediately after the shank piece, which is usually an arched piece of tempered metal or wood, has been secured in proper position to the shank portion of the insole. This procedure involves considerable time and labor, particularly as it requires two separate handlings of the shoe, and, unless the filler is carefully and uniformly applied it prevents the shoe from being properly leveled and the desired conformation of the shank portion of the shoe being obtained.

An object of the present invention, therefore, is to provide a novel combined shoe filler and shank piece which possesses many of the advantageous features of the plastic shoe filler and separate shank piece in use at the present time and in addition is capable of being more expeditiously and economically applied to the shoe than the separate filler and shank piece heretofore used.

In accordance with this object the combined shoe filler and shank piece of the present invention is composed of a non-plastic, resilient and flexible compound and comprises a forepart filler portion of such shape and thickness as to occupy the space within the inseam of the shoe bottom and provide a substantially level surface to receive the sole, and a shank portion extending into the shank of the shoe and shaped to conform to the longitudinal and transverse curvatures of the last and of the outsole in the shank, the shank portion being of such rigidity as to maintain the arched conformation of the shank portion of the shoe and to provide proper support for the foot in the shoe. In accordance with another feature of the invention the shank portion is reinforced by a strip of metal secured to the upper surface of the rubber compound. In accordance with a further feature of the invention, the novel shoe filler and shank piece consists of a vulcanized composition of ground cork and rubber and in the embodiment of the invention herein shown and described each filler and shank piece is molded, previously to being vulcanized, to the particular requirements of individual types of shoes.

Other objects and important features of the invention will now be described in connection with the accompanying drawing and will then be pointed out in the claims.

The drawing shows a perspective view of a preferred form of the filler of the present invention applied to a shoe.

In the preferred embodiment of the invention illustrated in the drawing the filler and shank piece consists of any suitable material or composition of materials 2 which will retain its shape in the shoe and which will be resilient, flexible and waterproof. A material possessing the above characteristics consists of a vulcanized composition of ground cork, leather scraps or similar comminuted material and a rubber compound. Preferably and as herein shown, this material is first shaped so that it may occupy the cavity or space bounded by the inseam 4 of the shoe and conform to the particular characteristics desired in the finished shoe, for example, having its tread portion 6 of such conformation as to provide support for the tread portion of the outsole in a substantially flat plane as illustrated in the drawing. This material is then vulcanized to render it substantially firm and flexible, whereby it may be applied to the shoe as an article of manufacture without the disadvantages incident to the use of filler materials at present in use.

In the illustrated embodiment of the invention the shank portion 8 of the filler extending through the shank of the shoe is shaped to conform to the longitudinal and transverse curvatures of the shank of the last and of the outsole and of such thickness as under ordinary conditions to be of sufficient rigidity after vulcanization properly to support the foot without other shank stiffening means and to maintain the arched conformation of the shoe in the shank. However, a strip 10 of metal may be secured to the inner side of the shank portion 8 of the filler to reinforce it as illustrated. This type of filler is of particular utility when used in connection with the style of shoes having molded outsoles, that is outsoles in which the tread portion of the outsole lies in a substantially flat plane and the shank portion of the outsole has a well defined "break" or sharp change in direction from the tread portion of the outsole since the filler may be readily molded to the peculiar conformation of the outsole and the last and, owing to the flexible and resilient characteristics of such composition after its vulcanization, will assist in maintaining the original molded shape of the outsole. While in the preferred embodiment of the invention the filler is molded or shaped to the individual requirements of a particular type of last a filler and shank piece is within the scope of this invention which is died out the desired size from sheet material and which may be of the above described compound, this procedure being advantageously employed when a forepart filler portion of uniform thickness is required for the shoe.

In use, the shoe filler and shank piece herein disclosed, being non-plastic and of a conformation required for the space within the inseam, is readily and neatly applied to the shoe by an operator and the shoe then immediately transferred for further operations upon it without the loss of time usually required to apply a separate shank piece and for a plastic filler to "set." Also, the filler may be used more economically than the present plastic fillers, since it is unnecessary to render the filler material plastic for use, and therefore, there is no loss or deterioration of the filler material from evaporation or the like. A shoe in which the filler and shank piece of the present invention is incorporated possesses a high degree of flexibility and resiliency, is waterproof and is extremely comfortable and of uniform wearing qualities. It will be further noted that the use of this shoe filler and shank piece with ordinary styles of shoes enables the usual shank to be entirely dispensed with or, if desirable, the shank portion may be reinforced at little expense thus contributing to economy of manufacture.

Having described my invention, I claim as new and desire to secure by Letters Patent of the United States:—

1. As an article of manufacture, a combined shoe filler and shank piece of rubber compound and comprising a forepart portion shaped to occupy the space within the inseam of the shoe and to provide a substantially flat surface for the tread portion of the sole, and a shank portion shaped to conform to the longitudinal and transverse curvatures of the last and the outsole and so vulcanized that while still flexible it is of such rigidity as to provide support for the arched portion of the foot and to maintain the arched conformation of the shank portion of the shoe.

2. As an article of manufacture, a combined shoe filled and shank piece of vulcanized rubber compound and comprising a forepart portion shaped to occupy the space within the inseam of the shoe and increasing in thickness rearwardly to approximately the ball line to provide a substantially flat surface to receive the tread portion of the outsole, and a shank portion curved abruptly from the maximum thickness of the forepart portion to produce a well-defined shoulder extending transversely of the filler along approximately the ball line, and shaped on its inner side to conform to the longitudinal and transverse curvatures of the shank portion of the last and on its upper side curved convexly from the ball line toward its rear end, said shank portion being of sufficient thickness to maintain the arched conformation of the shank portion of the shoe during the wear of the shoe.

3. As an article of manufacture, a combined shoe filler and shank piece of vulcanized rubber compound and comprising a forepart portion shaped to occupy the space within the inseam of the shoe and to provide a substantially flat surface to receive the tread portion of the outsole and a shank portion extending rearwardly from said forepart portion and shaped to conform to the longitudinal and transverse curvatures of the last and of the outsole, there being a break or sharp change in direction between the forepart and shank portions, and having a longitudinally arched metallic stiffening member associated with the shank portion and beginning at the rear of the break to reinforce said shank portion in maintaining its arched conformation.

In testimony whereof I have signed my name to this specification.

WALTER SHAW.